United States Patent [19]
Ahn et al.

[11] Patent Number: 6,138,211
[45] Date of Patent: Oct. 24, 2000

[54] HIGH-PERFORMANCE LRU MEMORY CAPABLE OF SUPPORTING MULTIPLE PORTS

[75] Inventors: Mun Weon Ahn; Hoai Sig Kang, both of Kyoungki-do, Rep. of Korea

[73] Assignee: Hyundai Electronics Industries Co., Ltd., Ichon, Rep. of Korea

[21] Appl. No.: 09/107,418

[22] Filed: Jun. 30, 1998

[30] Foreign Application Priority Data

Jun. 30, 1997 [KR] Rep. of Korea ................. 97-29665
Jun. 30, 1997 [KR] Rep. of Korea ................. 97-29666

[51] Int. Cl.[7] .................................................. G06F 12/12
[52] U.S. Cl. ..................... 711/136; 711/160; 711/156; 711/128
[58] Field of Search ............................... 711/136, 160, 711/118, 156, 159, 128, 167

[56] References Cited

U.S. PATENT DOCUMENTS

| | | | |
|---|---|---|---|
| 4,008,460 | 2/1977 | Bryant et al. | 711/136 |
| 4,168,541 | 9/1979 | DeKarske | 365/49 |
| 5,325,511 | 6/1994 | Collins et al. | 711/128 |
| 5,471,605 | 11/1995 | Ruby | 711/136 |
| 5,845,320 | 12/1998 | Pawlowski | 711/136 |

OTHER PUBLICATIONS

5–bit Least Recently Used Code for 4–Way Set Associativity, IBM Technical Disclosure Bulletin vol. 31 No. 11, Apr. 1989.

*Primary Examiner*—Eddie P. Chan
*Assistant Examiner*—Yamir Encarnación
*Attorney, Agent, or Firm*—Jacobson, Price, Holman & Stern, PLLC

[57] ABSTRACT

In a high performance microprocessor adopting a superscalar technique, necessarily using a cache memory, TLB, BTB and etc. and being implemented by 4-way set associative, there is provided an LRU memory capable of performing a pseudo replacement policy and supporting multi-port required for operating various blocks included in the microprocessor. The LRU memory comprises an address decoding block for decoding an INDEX_ADDRESS to produce a READ_WORD and a WRITE_WORD in response to the first phase and a second phase of the CLOCK signal, respectively; an LRU storing block; a way hit decoding block for decoding a WAY_HIT to produce a MODIFY CONTROL signal in response to the second phase of the CLOCK signal; a data modifying block for latching a READ_DATA from the LRU storing block to produce a DETECTED DATA and modifying it in response to the MODIFY CONTROL signal so as to produce a WRITE_DATA to the LRU storing block; and a write way decoding block for analyzing the DETECTED DATA so as to produce a WRITE_WAY. This LRU memory reduces the load of superscalar microprocessor required for controlling the cache memory, TLB and BTB and simplifies an interface therebetween, so as to perform the LRU updating process in high speed, thereby improving the performance of the superscalar microprocessor.

20 Claims, 10 Drawing Sheets

HIGH-PERFORMANCE LRU MEMORY CAPABLE OF SUPPORTING MULTIPLE PORTS

BACKGROUND OF THE INVENTION

The present invention relates to a superscalar microprocessor, more particularly, to an LRU (Least Recently Used) memory for storing the history of memory access which is made for replacement or updating the content of the memory.

As is well known in this art, the superscalar structured microprocessor performs two or more instructions at every cycle. For doing this, a cache memory, TLB (Translation Lookaside Buffer), BTB (Branch Target Buffer), and etc. must support two or more ports and are in general implemented by 4-way set associative.

At this time, for the purpose that LRU memory required for implementation of 4-way set associative supports two or more ports, it is noted that the results of entries being simultaneously accessed should be reflected to change the entry access history (LRU data).

As an example, considering the memory access result of a cache memory for supporting two port, there are cases that both of two ports are missed; that the first port is missed and the second port is hit; that the first port is hit and the second port is missed; and that both of two ports are hit. The cache memory access information corresponding these four cases is discriminated so as to reflect the entry access history (that is, LRU data), in which the operations of accessing the LRU memory, modifying the LRU data, and then writing the modified LRU data to the LRU memory should be performed at every cycle. Such operations are made in a cache control block in the conventional.

In this case, the LRU data path is read out from the LRU memory and transferred to the cache control block. The modification (or reflection) of the LRU data path is made in the cache control block and then transferred to the LRU memory to be recorded. This may be a critical path of the cache memory access.

FIG. 1 illustrates a conventional 8-entry 4-way set associative LRU memory for supporting two ports, which includes an address decoder block 102 and an LRU SRAM block 104.

Referring to FIG. 1, the address decoder block 102 latches and decodes the 3-bit index address for 8 entries in synchronization with a CLOCK. In addition, when the LRU_READ signal is activated, the word line signal WORD[7:0] is made in synchronization with the READ_TIME signal and then outputted to the LRU SRAM block 104. Also, when the LRU_WRITE signal is activated, the word line signal WORD[7:0] is made based on the decoding result in synchronization with the WRITE_TIME signal so as to be outputted to the LRU SRAM block 104.

When the LRU_READ signal is activated, the LRU SRAM block 104 reads only the enabled entry in response to the WORD[7:0] supplied from the address decoder block 102, and produces the stored 3-bit READ_DATA to a control block (not shown). Alternatively, when the LRU_WRITE signal is activated, the LRU SRAM block 104 stores the externally applied 3-bit WRITE_DATA to the enabled entry in response to the WORD[7:0] supplied from the address decoder block 102.

The conventional LRU memory as described above, can be easily implemented, but has a difficulty in that the control block should control the READ_TIME, WRITE_TIME, WRITE_DATA, and etc., in high accuracy. Also, there is a burden in that the operation of the receiving the READ_DATA and generating the WRITE_DATA (LRU updating data) reflecting the way-hit information, must be speedily performed. Moreover, there is a problem that, since all of the reading out operation from the LRU memory and the operations of the control block for receiving the read out data READ_DATA and for generating and then transferring the WRITE_DATA to the LRU memory, must be performed at every cycle, these operations impede the implementation of high performance.

SUMMARY OF THE INVENTION

Accordingly, the present invention is provided for solving the above problems. The object of the present invention is to provide an LRU memory for supporting a high performance multi-port, capable of improving the performance of the superscalar microprocessor by speedily performing the LRU modification and simply implementing the control block.

To accomplish the above object of the present invention, there is provided an LRU memory capable of performing a pseudo replacement policy, comprising: an address decoding means for decoding an INDEX_ADDRESS to produce a READ_WORD in response to a first phase of a CLOCK signal and to produce a WRITE_WORD in response to a second phase of the CLOCK signal; an LRU storing means for storing a plurality of LRU data, producing an LRU data from a cell corresponding to the READ_WORD as a READ_DATA, and writing a WRITE_DATA to a cell corresponding to the WRITE_WORD; a way hit decoding means for decoding a WAY_HIT so as to produce a MODIFY CONTROL signal in response to the second phase of the CLOCK signal; a data modifying means for latching the READ_DATA from the LRU storing means to produce a DETECTED DATA and modifying the READ_DATA in response to the MODIFY CONTROL signal so as to producing the WRITE_DATA to the LRU storing means; and a write way decoding means for analyzing the DETECTED DATA in accordance with the pseudo replacement policy, so as for producing a WRITE_WAY.

The LRU memory further comprises a control means for generating a plurality of control signals required for the LRU memory in response to a CLOCK signal, an LRU_READ signal used for enabling a read operation for the LRU memory, and an LRU_WRITE signal used for enabling a write operation for the LRU memory; and wherein said control means produces: a READ PRECHARGE_TIME signal which becomes non-active in response to a first phase of the CLOCK signal and being used for precharging the READ_DATA; a READ_TIME signal activated when the CLOCK signal is the first phase, the READ PRECHARGE_TIME signal is non-active and the LRU_READ is active, and being used for producing the READ_WORD in said address decoding means; a READ LATCH TIME signal which becomes active after an activation of the READ_TIME signal and being used in said data modifying means; an LRU MODIFY_TIME signal activated in responsive to the second phase of the CLOCK signal and being used for generating the MODIFY CONTROL signal in said way hit decoding means; and a WRITE_TIME signal activated when the CLOCK signal is the second phase, the LRU MODIFY_TIME signal is active and the LRU_WRITE signal is active, and being used for producing the WRITE_WORD in said address decoding means. This control means may further produces a WAY DECODER LATCH_TIME signal activated when the CLOCK signal is the second phase, the LRU MODIFY_TIME signal is active and the LRU_READ is active, and being used for producing the WRITE_WORD in said write way decoding means.

According to the preferred embodiment of the present invention, the LRU memory further comprises a plurality of ports and the INDEX_ADDRESS includes a plurality of port INDEX_ADDRESS signals, for example A_INDEX_ADDRESS signal and B_INDEX_ADDRESS signal, each of which relates to one port (that is, A-port and B_port, respectively). Also, the address decoding means compares the port INDEX_ADDRESS signals with one another, and if all of the port INDEX_ADDRESS signals are the same, said address decoding means makes only one WRITE_WORD related to one port activated. The address decoding means may also produce a COMPARE_HIT signal activated when the plurality of said port INDEX_ADDRESS signals are the same with each other and provide the COMPARE_HIT signal to said way hit decoding means.

According to the preferred embodiment of the present invention, the WRITE_WORD includes a first port WRITE_WORD (e.g. A_WRITE_WORD) and a second port WRITE_WORD (e.g. B_WRITE_WORD); the WRITE_DATA includes a first port WRITE_DATA (e.g. A_WRITE_DATA) and a second port WRITE_DATA (e.g. B_WRITE_DATA); the READ_WORD includes a first port READ_WORD (e.g. A_READ_WORD) and a second port READ_WORD (e.g. B_READ_WORD); and the READ_DATA includes a first port READ_DATA (e.g. A_READ_DATA) and a second port READ_DATA (e.g. B_READ_DATA).

The write way decoding means may determine the least recently used way as the WRITE_WAY.

In addition, the LRU memory can support a single port as well as multiple ports.

BRIEF DESCRIPTION OF THE DRAWINGS

For a more complete understanding of the present invention and the advantage thereof, reference is now made to the following description taken in conjunction with the accompanying drawings in which.

DETAILED DESCRIPTION OF THE PRESENT INVENTION

The preferred embodiment of the present invention will hereinafter be described in detail with reference to the accompanying drawings.

At first, the technical distinctive characteristic of the present invention is that the LRU memory supports in itself the functions which are implemented at the control block in the conventional. So, though the memory structure becomes a little complex, but the simplification of the data path and the control path can be attained so that the high performance of the object of the present invention can be implemented.

In addition, according to the present invention, the LRU memory is read out and the read out data is modified by the way-hit information. The critical path of the LRU memory access for recording the modified LRU data to the LRU memory is divided into an LRU memory read/modification data path and an LRU modification/record path so as for simultaneously performing, which results in realization of high performance.

Figure 1:
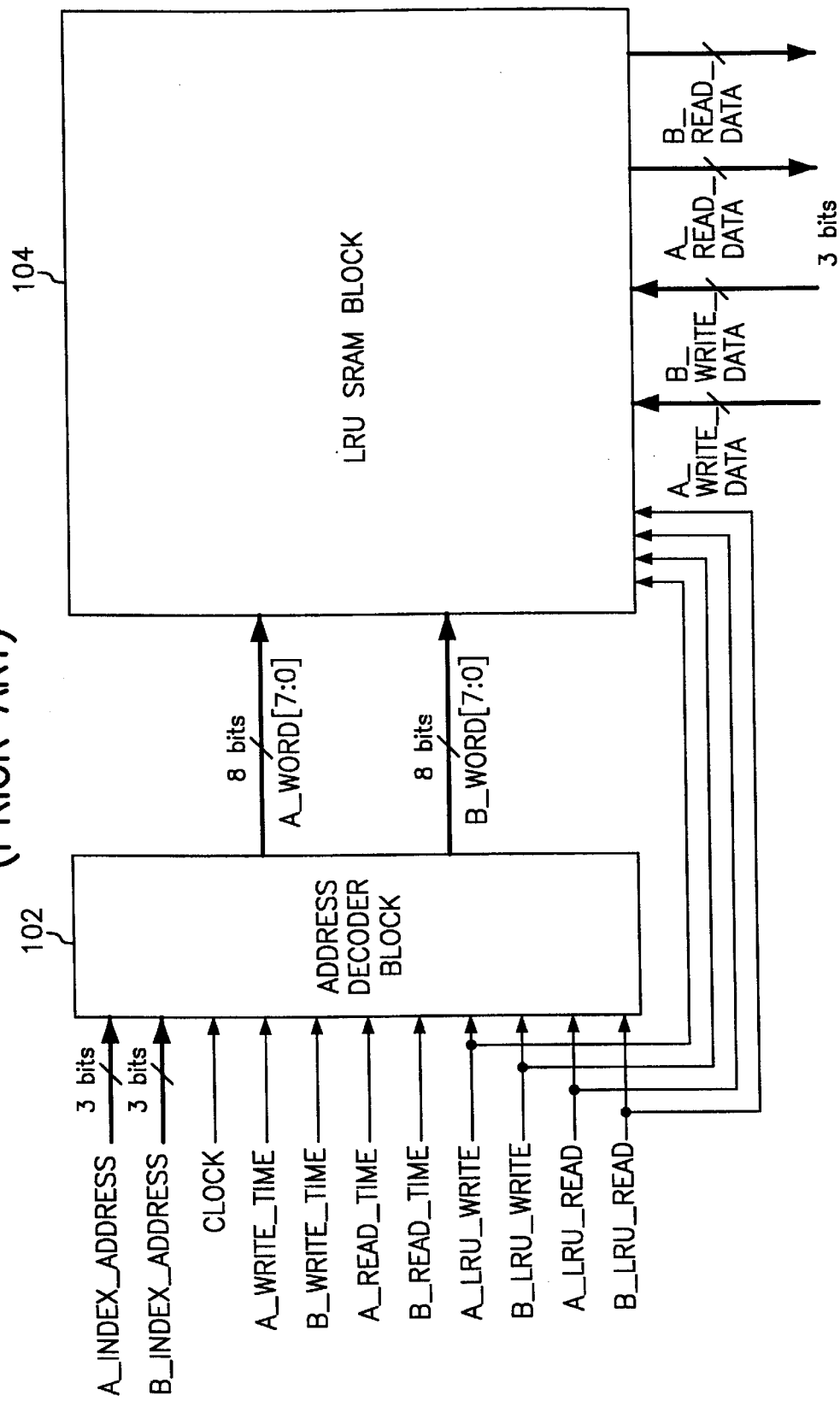
FIG. 1 illustrates a conventional LRU memory for supporting 8-entry and 4-way set associative 2-port.
Figure 2:
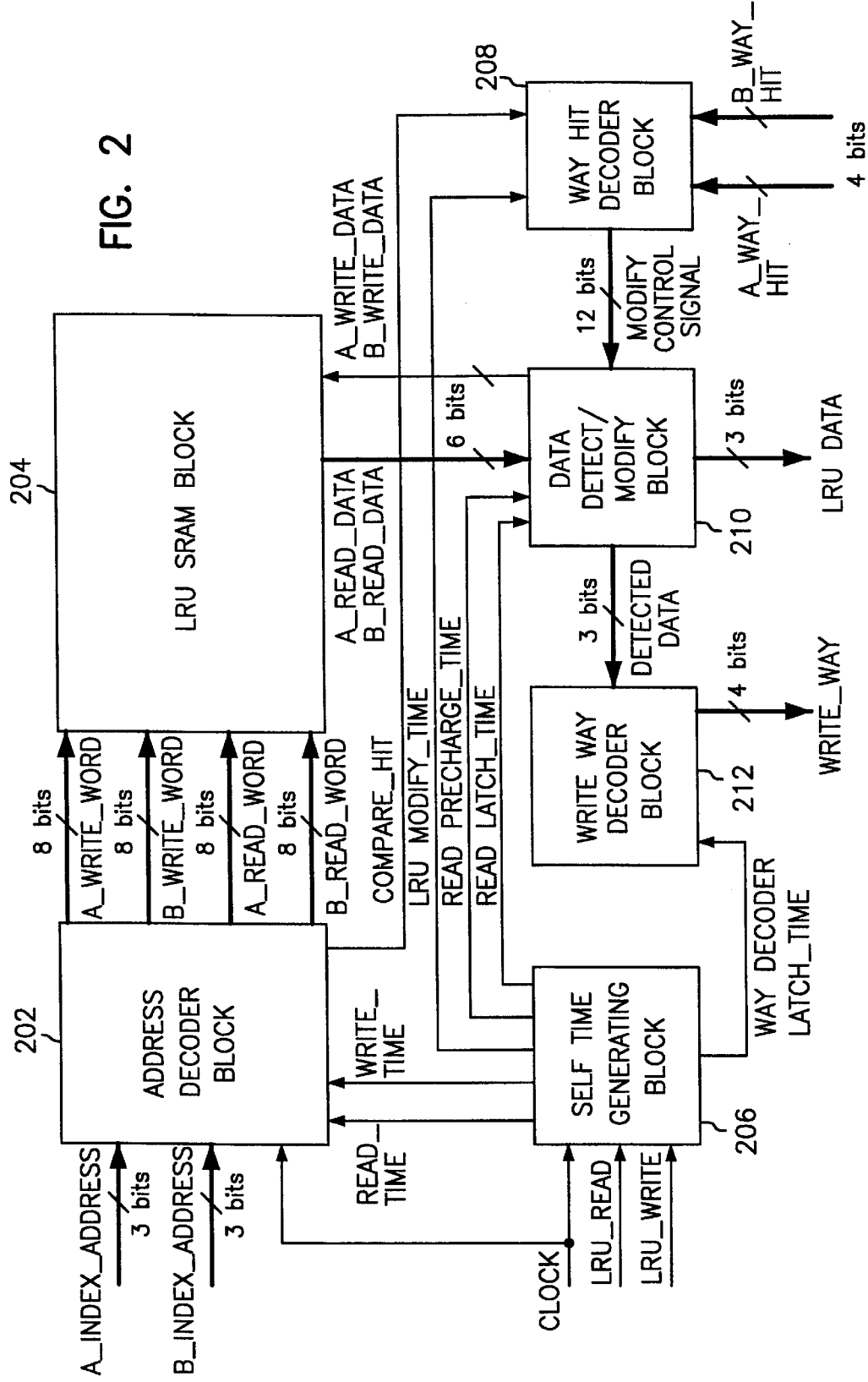
FIG. 2 is a block diagram of a high-performance LRU memory for supporting a multi-port according to one embodiment of the present invention.

FIG. 2 is a block configuration diagram of LRU memory for supporting high performance multi-ports according to a preferred embodiment of the present invention, which is an implementation example of 8-entry 4-way associative LRU memory for supporting 2 ports.

As shown in FIG. 2, the LRU memory of the present invention, comprises an address decoder block 202, an LRU SRAM block 204, a self time generating block 206, a write way decoder block 212, a data detect/modify block 210 and a way hit decoder block 208.

Referring to FIG. 2, in the address decoder block 202, since this embodiment supports 8 entries, both of A_port and B_port receive 3-bit index address and latch it in synchronization with the CLOCK externally applied thereto, and then decode the 3-bit index address. Both of A_port and B_port also transfer 8-bit READ_WORD to the LRU SRAM block which will be described below, in response to the READ_TIME signal provided from the self time generating block 206 which is also described below, and both ports generate the WRITE_WORD in response to the WRITE_TIME signal provided from the self time generating block 206, so as to transfer the WRITE_TIME signal to the LRU SRAM block 204.

In addition, in the address decoder block 202, when the A_port and B_port access the same entry, the modified data should be written only one time. Therefore, an A_port index and a B_port index are compared with each other, and if the comparison result is "same", a COMPARE_HIT signal is activated to the way hit decoder block 208 which will be described below, and then B WRITE_WORD is disabled and A WRITE_WORD is enabled.

Figure 3:
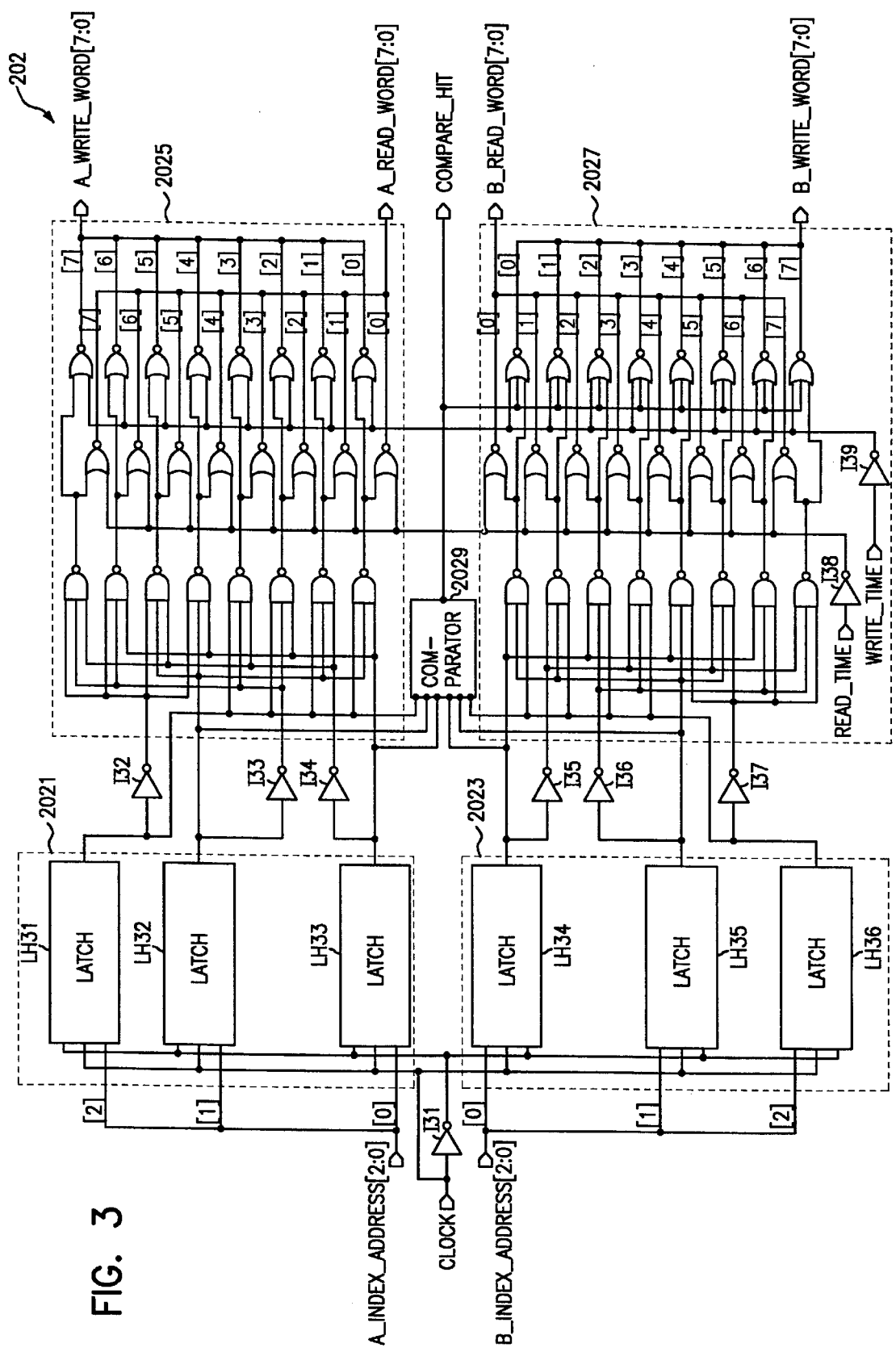
FIG. 3 is a detailed circuit diagram of the address decoder block shown in FIG. 2.

Like this, the address decoder block 202 adopted by the LRU memory of the present invention, can be implemented by a plurality of logic gates, as shown in FIG. 3, which should be considered as only one example.

In other words, the address decoder block 202 adopted as an example according to the preferred embodiment of the present invention, comprises latch blocks 2021 and 2023, a B_port read/write word generating block 2027 and a comparator 2029. The latch block 2021 includes three latches LH31, LH32 and LH33 each of which receives and latches 3-bit of A_port index address. The latch block 2023 includes three latches LH34, LH35 and LH36 each of which receives 3-bit of B_port index address. The B_port read/write word generating block 2027 receives and decodes the index address from the latch block 2023 in response to the READ_TIME and the WRITE_TIME signals, so as to generate 8-bit of WRITE_WORD and READ_WORD for B_port. The comparator 2029 compares the A_port index address from the latch block 2021 with the B_port index address from the latch block 2023 so as to produce a COMPARE_HIT signal.

Referring to FIG. 3, each of latches LH31, LH32 and LH33 of the latch block 2021, latches the 3-bit index address applied thereto through the A_port and then transfers it to the next stage of A_port read/write word generating block 2025 in synchronization with the CLOCK signal and the inverted CLOCK signal from an inverter I31, respectively, during the high state duration of the CLOCK. Also, each of latches LH34, LH35 and LH36 of the latch block 2023, latches the 3-bit index address applied thereto through the B_port and then transfers it to the next stage of B_port read/write word generating block 2027 in synchronization with the CLOCK signal and the inverted CLOCK signal from the inverter I31, when the CLOCK signal is a high level.

Next, the A_port read/write word generating block 2025, includes a first NAND gate group, a first NOR gate group and a second NOR gate group. The first NAND gate group is composed of eight NAND gates each of which has 3-inputs for selectively receiving among the outputs of three latches LH31, LH32 and LH33 and the three inverted outputs from the inverters I32, I33 and I34. The first NOR gate group includes eight 2-input NOR gates each of which receives an output of the corresponding NAND gate in the first NAND gate group and the inverted READ_TIME signal from the inverter I38, in which the inverted READ_TIME signal is made by inverting the READ_TIME signal provided from the self time generating block 206 of FIG. 2, so that the first NOR gate group generates A_READ_WORD[7:0]. The second NOR gate group includes eight 2-input NOR gates each of which receives an output of the corresponding NAND gate in the first NAND gate group and the inverted WRITE_TIME signal from the inverter I39, in which the inverted WRITE_TIME signal is made by inverting the WRITE_TIME signal provided from the self time generating block 206 of FIG. 2, so that the second NOR gate group generates A_WRITE_WORD[7:0]. Here, it can be seen that the first NAND gate group within the block 2025 and the inverters I32, I33 and I34 are commonly used for generating the A_READ_WORD as well as the A_WRITE_WORD.

Also, the B_port read/write word generating block 2027, includes a second NAND gate group, a third NOR gate group and a fourth NOR gate group. The second NAND gate group includes eight NAND gates each of which has three inputs for selectively receiving among the outputs of three latches LH34, LH35 and LH36 and the three inverted outputs from the inverters I35, I36 and I37. The third NOR gate group includes eight 2-input NOR gates each of which receives an output of the corresponding NAND gate in the second NAND gate group and the inverted READ_TIME signal from the inverter I38, in which the inverted READ_TIME signal is made by inverting the READ_TIME signal provided from the self time generating block 206 of FIG. 2, so that the third NOR gate group generates B_READ_WORD[7:0]. The fourth NOR gate group includes eight 2-input NOR gates each of which receives an output of the corresponding NAND gate in the second NAND gate group and the inverted WRITE_TIME signal from the inverter I39, in which the inverted WRITE_TIME signal is made by inverting the WRITE_TIME signal provided from the self time generating block 206 of FIG. 2, so that the fourth NOR gate group generates B_WRITE_WORD[7:0]. Here, it can be seen that the second NAND gate group within the block 2027 and the inverters I35, I36 and I37 are commonly used for generating the A_READ_WORD as well as the A_WRITE_WORD.

In addition, the comparator 2029 receives the outputs of the respective latches LH31, LH32 and LH33 of the latch block 2021 and the outputs of the respective latches LH34, LH35 and LH36 of the latch block 2023 so as to compare them, thereby generating a COMPARE_HIT signal based on the comparing result and applying it to the way hit decoder block 208 described below. When the A_port and B_port access the same entry, the modified LRU data is written only once. So, in case that the A_port index address is the same with B_port index address, the B_WRITE_WORD is disabled and the A_WRITE_WORD is enabled by enabling the COMPARE_HIT signal.

Returning to FIG. 2, the LRU SRAM block 204 is a 8*3 SRAM cell array block for supporting 2 port (A_port and B_port) access dual port (read port and write port) and stores LRU history bit by entries. Here, the reason for supporting the dual port is that the read operation and the write operation are separated, thereby concurrently processing the write operation and the read port precharge operation, so that the LRU read data path and the modification/write data path can be divided.

Figure 4:
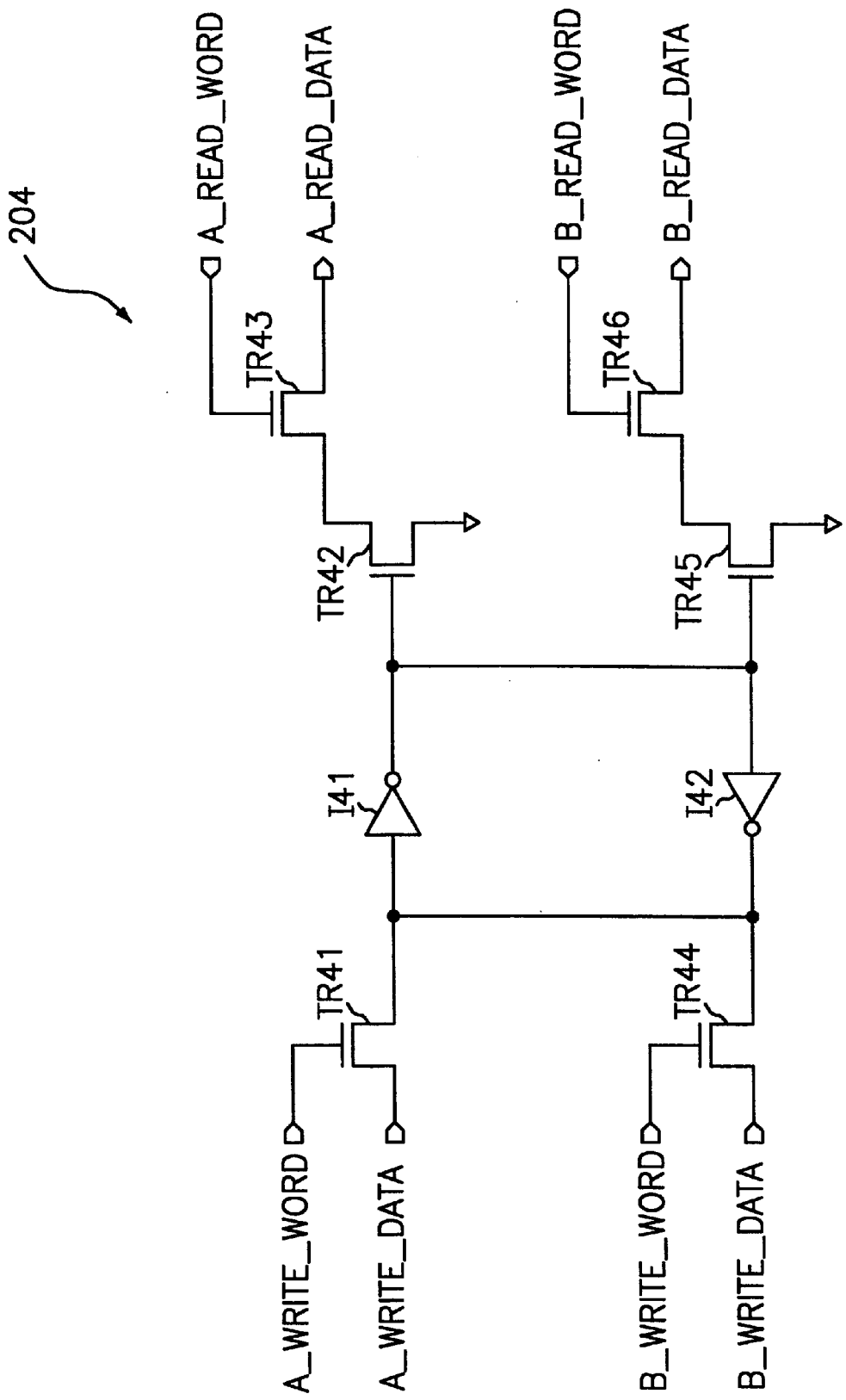
FIG. 4 is a logic circuit diagram for illustrating an implementation of the LRU SRAM block shown in FIG. 2.

The respective cell constituting the LRU SRAM block of the present invention, as shown in FIG. 4 as an example, is dual-structured. This cell includes six transistors TR41–TR46, two inverters I41 and I42. So, it can be implemented a dual port in which a simultaneous access to the both A_port and B_port can be supported and the read operation and the write operation can be separated, thereby realizing the high performance by precharging the read data port at write duration after the read operation.

That is, the respective SRAM cell comprises transistors TR41, TR42, TR43, TR44, TR45 and TR46 and inverters I41 and I42. For the transistor TR41, the gate thereof is coupled to the A_WRITE_WORD line and the source thereof is coupled to the A_WRITE_DATA line. The gate of the transistor TR42 is coupled to the output of the inverter I41 and the source thereof is coupled to a ground. In the transistor TR43, the gate thereof is coupled to A_READ_WORD line, the source thereof is coupled to the drain of the transistor TR42 and the drain thereof is coupled to A_READ_DATA line. In the transistor TR44, the gate thereof is coupled to B_WRITE_WORD, the source thereof is coupled to B_WRITE_DATA line and the drain thereof is coupled to the output of the inverter I42. In the transistor TR45, the gate thereof is coupled to the output of the inverter I41 and the source thereof is coupled to the ground. In the transistor TR46, the gate thereof is coupled to the B_READ_WORD line, the source thereof is coupled to the drain of the transistor TR45 and the drain thereof is coupled to the B_READ_DATA line. Here, the drain of the transistor TR41, the input of the inverter I41, the drain of the transistor TR44 and the output of the inverter I42 are commonly coupled, and the input of the inverter I41, the gate of the transistor TR42, the output of the inverter I42 and the gate of the transistor TR45 are commonly coupled.

Returning to FIG. 2, the self time generating block 206 is a block for generating in itself control clocks and control signals, in which the control clocks and the control signals are required to be complex and be accurate for the purpose of realizing a high speed operation intended in this invention. The self time generating block 206 generates the READ_TIME signal and the WRITE_TIME signal based on the CLOCK signal, the LRU_READ signal and the LRU_WRITE signal which are applied from an external control block (not shown), thereby providing them the above-mentioned address decoder block 202. Also, the block 206 generates a WAY DECODER LATCH_TIME signal to provide it to the write way decoder block 208 described below and generates a READ LATCH_TIME signal and a READ PRECHARGE_TIME signal to provide it to the data detect/modify block 210. The block 206 also generates an LRU MODIFY_TIME signal to provide it to the way hit decoder block 208.

Figure 6:
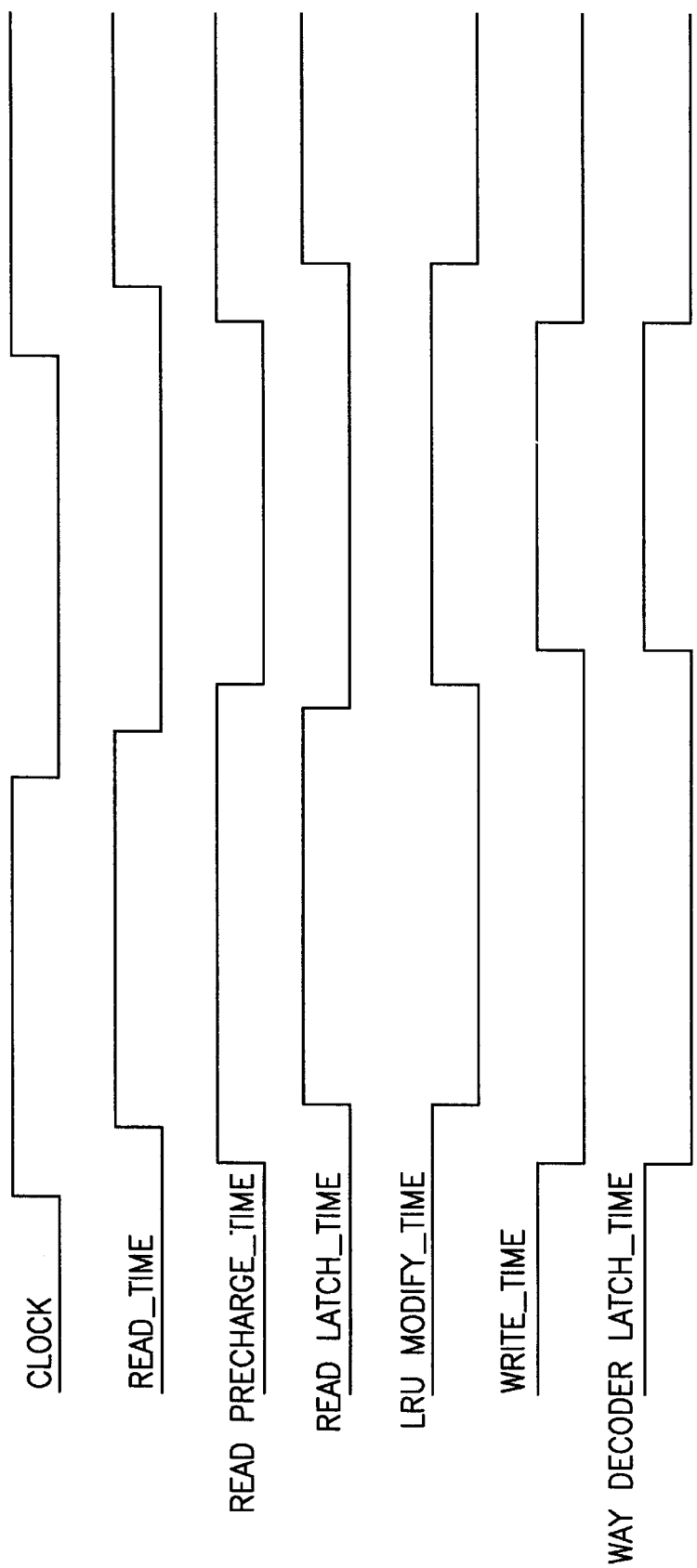
FIG. 6 is a signal timing chart at the self time generating block shown in FIG. 2.

The timing of various signals generated in the self time generating block 206 is in detail illustrated in FIG. 6. Referring to this figure, it can be known through this figure that the active duration of the READ_TIME signal (which is a "high" active signal) doesn't overlap with the active duration of the READ PRECHARGE_TIME signal (which is a "low" active signal) and the active duration of the READ PRECHARGE_TIME signal (which is a "low" active signal) doesn't overlap with the active duration of the READ LATCH_TIME signal (which is a "high" active signal). Also, after the LRU MODIFY_TIME signal (which is a "high" active signal) is enabled, the WRITE_TIME signal (which is a "high" active signal) is activated, and the active duration of the READ LATCH_TIME signal (which is a "high" active signal) doesn't overlaps with the active duration of the WAY DECODER LATCH_TIME (which is a "high" active signal). Therefore, the timing relationship between such control clocks plays a very important role in implementing a high performance multi-port LRU memory which is intended to acquire in this invention.

At this time, the READ_TIME signal among the signals generated in the self time generating block 206 is enabled when the eight decoded lines are effective, in which the eight decoded lines are controlled by decoding the 3-bit index address. The READ_TIME signal is then disabled when the READ_DATA becomes effective by sufficiently performing an operation regarding to the READ_WORD. The WRITE_TIME signal is activated when the write data is effective in the data detect/modify block 210 and is deactivated when the SRAM cell of the LRU SPAM block 204 is updated by sufficiently performing an operation regarding to the WRITE_WORD. The LRU MODIFY_TIME signal is enabled when the write data is latched in the data detect/modify block 210 and the way hit information gets an information required for modifying the LRU data modification from the way hit decoder block 208, and it is disabled when the way hit decoding result is fully reflected to the LRU data in the data detect/modify block 210.

In addition, the READ PRECHARGE_TIME signal among the signals generated in the self time generating block 206 becomes active when the READ_WORD signal is disabled, and it becomes nonactive before the READ_WORD signal is enabled. The READ LATCH_TIME signal represents the time at which a latching the READ_DATA is made when the READ_WORD signal becomes active and the READ_DATA becomes effective. The WAY DECODER LATCH_TIME signal is a signal used for latching the decoded write way data in the write way decoder block 208.

Figure 5:
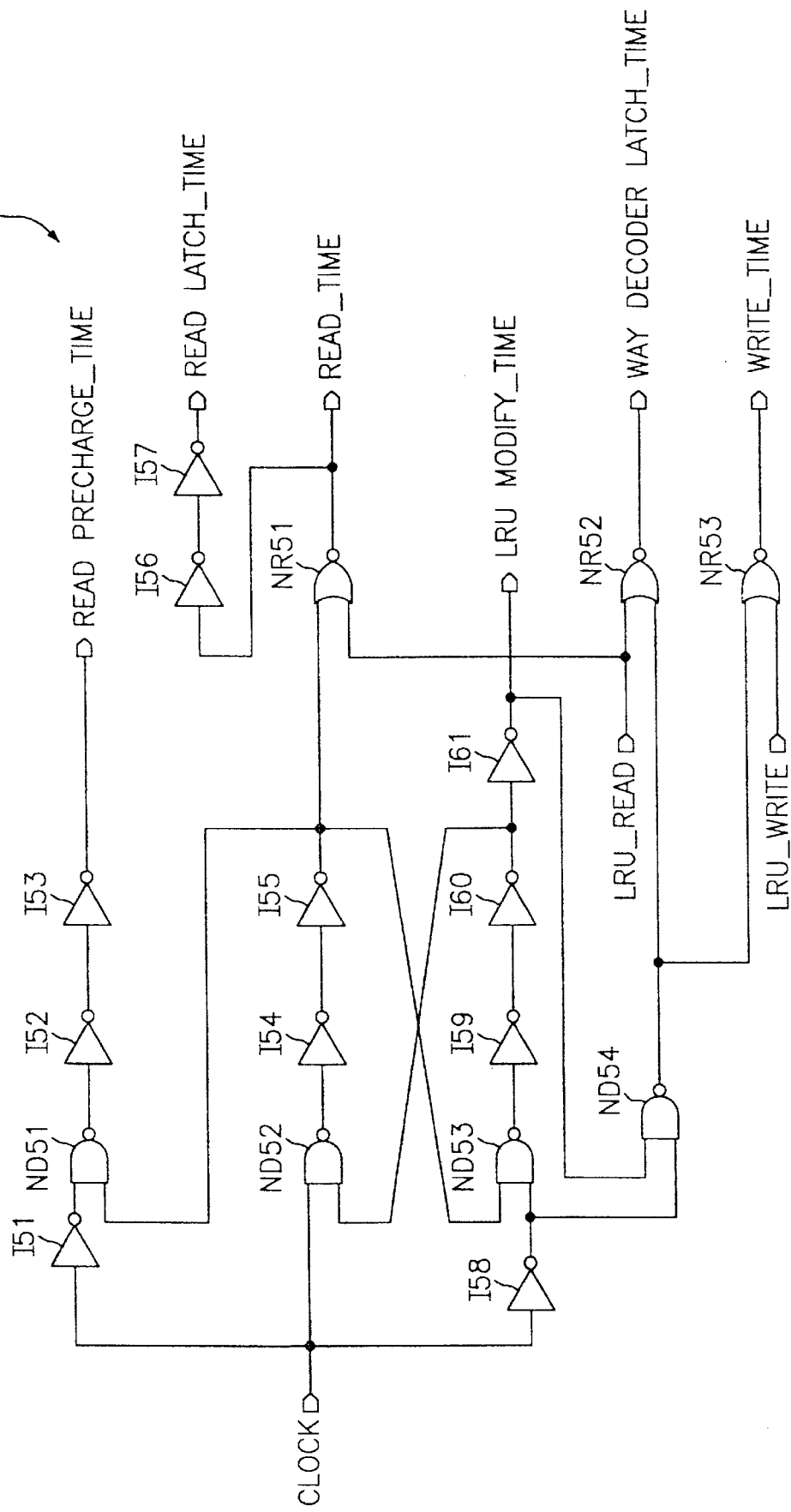
FIG. 5 is a detailed logic circuit diagram of the self time generating block shown in FIG. 2.

As described above, the self time generating block 206 for generating various signal required for high speed processing, can be implemented using 2-phase non-overlap clock driver, as shown in FIG. 5 as one example, for the purpose that it is not affected by the frequency change of the CLOCK signal. Here, the READ PRECHARGE_TIME signal is a "low" active signal and the other signals are "high" active signals.

As shown in FIG. 6, the operations related to "LRU data reading" are performed in response to the first phase (e.g. "high" state) of the CLOCK signal, while the operations related to "LRU data writing" are performed in response to the second phase (e.g. "low" state) of the CLOCK signal. So, the operations of the LRU memory can be in parallel processed, thereby improving the operation speed.

That is, referring to FIG. 5, the READ PRECHARGE_TIME signal generated in the self time generating block 206, can be generated through a logic circuit group including inverters I51, I52 and I53 and a NAND gate ND51. The inverter I51 receives and inverts the CLOCK signal. The NAND gate ND51 is coupled for receiving the output of the inverter I51 and the output of the inverter I55. The inverters I52 and I53 are coupled in series for receiving the output of the NAND gate ND51.

Also, the READ_TIME signal generated in the self time generating block 206, can be generated through a logic circuit group including a NAND gate ND52, two inverters I54 and I55 and a NOR gate NR51. The NAND gate ND52 is coupled for receiving the CLOCK signal and the output of the inverter I60. The inverters I54 and I55 are coupled in series for receiving the output of the NAND gate ND52 and the NOR gate NR51 is coupled for receiving the output of the inverter I55 and the LRU_READ signal provided from an external control block. The READ LATCH_TIME signal can be generated through a logic circuit group including two inverters I56 and I57 which are coupled in series for receiving the output of the NOR gate NR51.

In the meantime, the LRU MODIFY_TIME signal generated in the self time generating block 206, can be generated through a logic circuit group including inverters I58, I59, I60 and I61 and a NAND gate ND53. The inverter I58 is coupled for receiving the CLOCK signal and the NAND gate ND53 is coupled for receiving the output of the inverter I55 and the output of the inverter I58. The three inverters I59, I60 and I61 are coupled in series for receiving the output of the NAND gate ND53.

Next, the WAY DECODER LATCH_TIME signal generated in the self time generating block 206, can be generated through a logic circuit group including a NAND gate ND54 and a NOR gate NR52. The NAND gate ND54 is coupled for receiving the output of the inverter I61 and the output of the inverter I58 and the NOR gate NR52 is coupled for receiving the LRU_READ signal applied from an external control block and the output of the NAND gate ND54. Here, the LRU_READ signal and the LRU_WRITE signal are "low" active signals. The WRITE_TIME signal can be generated through a NOR gate NR53 which is coupled for receiving the output of the NAND gate ND54 and the LRU_WRITE signal applied from an external control block.

Referring again to FIG. 2, the way hit decoder block 208 receives the way hit signal from an TAG block of an external cache and obtains an information regarding to the modified bit based on the pseudo LRU replacement policy, in which the way hit signal is composed of 4 bits for respective ports A and B. Also, the block 208 generates a modify control signal based on the LRU MODIFY_TIME signal applied from the above-described self time generating block 206, and provides it to the data detect/modify block 210, in which the modify control signal is 6 bits for respective ports A and B. If the COMPARE_HIT signal generated from the above-described address decoder block 202 is enabled, the block 208 generates the modify control signal using sequentially the way hit information of A_port and B_port, so as to reflect it to the modify control signal of A_port.

At this time, the modify control signal can be made by 6 bits per port, which means that the modify control signal includes two signals, that is a set enable signal and a reset enable signal, per bit of the LRU data. This is used in setting (that is, changing from logic "0" to logic "1") or resetting (that is, changing from logic "1" to logic "0") the LRU bit to be intended to change based on the decoding result of the way hit or in resetting, which makes it easy and faster to modify the LRU data, thereby making the high performance operation intended in the present invention possible. For supporting this function, the read data latch circuit in the data detect/modify block 210 described below, supports the setting and the resetting functions.

Figure 7:
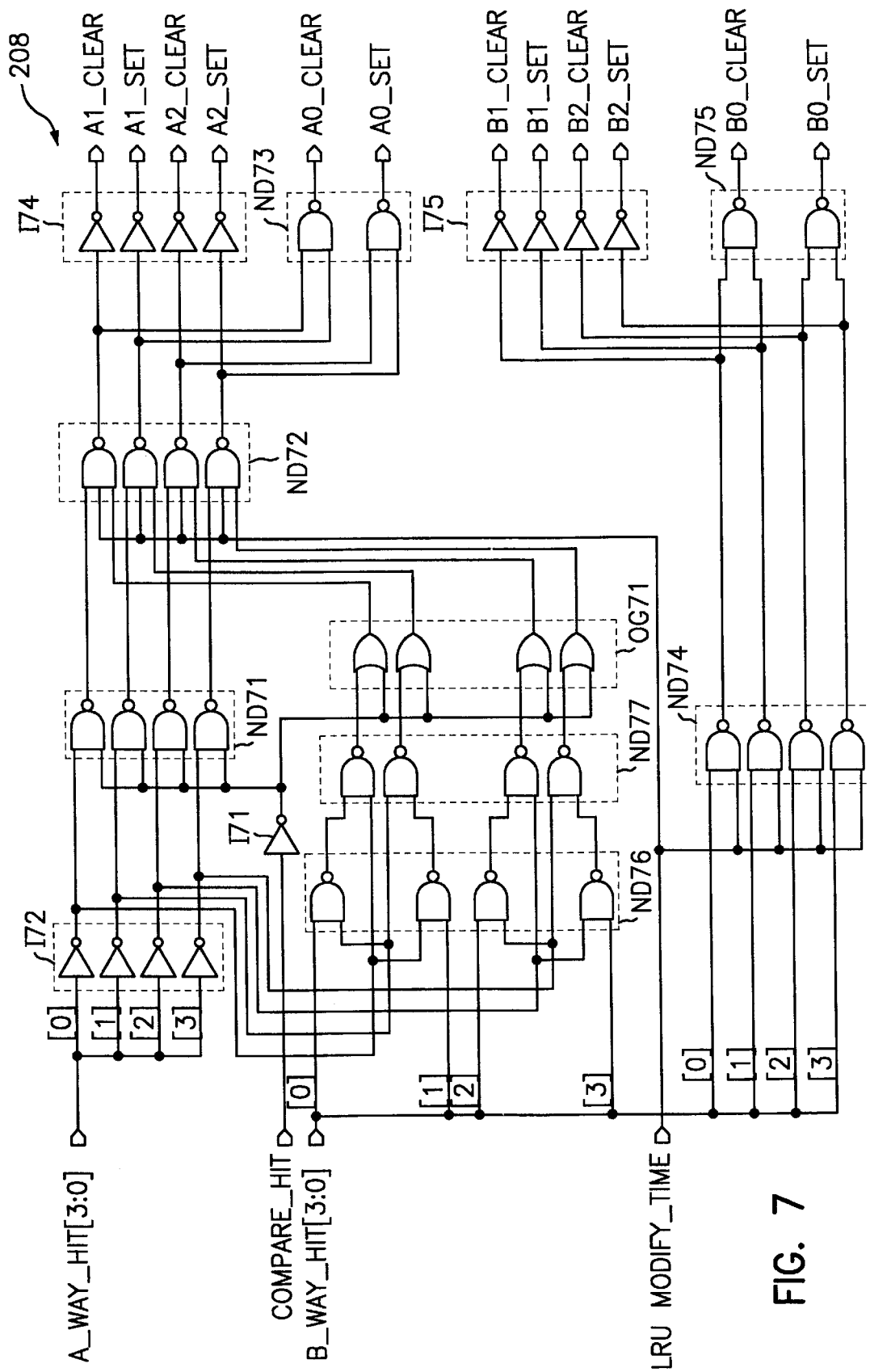
FIG. 7 is a detailed logic circuit diagram of the way hit decoder block shown in FIG. 2.

FIG. 7 shows the detailed logic circuit diagram of the way hit decoder block according to the present invention, which has such a function as above.

Referring to FIG. 7, the way hit decoder block 208 includes NAND gate groups ND71, ND72, ND73, ND74, ND75, ND76 and ND77, OR gate groups OG71, a inverter I71, and inverter groups I72, I74 and I75. The inverter group I72 includes 4 inverters each of which receives a corresponding bit of the A_WAY_HIT[3:0] signal. The NAND gate group ND 71 includes 4 NAND gates each of which is coupled for receiving the corresponding output of the inverter group I72 and an inverted COMPARE_HIT signal from the inverter I71, in which the inverted COMPARE_HIT signal is made by inverting the COMPARE_HIT signal provided from the address decoder block 202 of FIG. 2. The NAND gate group ND76 includes 4 NAND gates each of which is coupled for receiving a corresponding bit of B_WAY_HIT[3:0] and the corresponding output of the inverter group I72. The NAND gate group ND77 includes 4 NAND gates each of which is coupled for receiving the corresponding output of the NAND gate group ND76 and the corresponding output of the inverter group I72. The OR gate group OG71 includes 4 OR gates each of which is coupled for receiving the corresponding output of the NAND gate group ND77 and the inverted COMPARE_HIT signal from the inverter I71. The NAND gate group ND72 includes 4 NAND gate each of which is coupled for receiving the corresponding output of the NAND gate group ND71, the corresponding output of the OR gate group OG71 and the LRU MODIFY_TIME signal provided from the self time generating block 206 of FIG. 2. The NAND gate group ND73 includes 2 NAND gates, in which one NAND gate is coupled for receiving the two outputs of the NAND gate group ND72 so as to produce an A0_CLEAR signal and the other NAND gate is coupled for receiving the other two outputs of the NAND gate group ND72 so as to produce an A0_SET signal. The inverter group I74 includes 4 inverters each of which is coupled for receiving the corresponding output of the NAND gate group ND72 so as to produce an A1_CLEAR, an A1_SET, an A2_CLEAR and an A2_SET, respectively. Here, the A1_CLEAR, the A1_SET, the A2_CLEAR, and the A2_SET constitutes a part of the modify control signals for A_port which is composed of 6 bits.

In addition, the NAND gate group ND74 includes 4 NAND gates each of which is coupled for receiving the corresponding bit of the B_WAY_HIT[3:0] supplied from an external cache tag block and the LRU MODIFY_TIME signal provided from the self time generating block 206 of FIG. 2. The NAND gate group ND75 includes 2 NAND gates, in which one NAND gate is coupled for receiving the first two outputs of the NAND gate group ND74 so as to produce a B0_CLEAR and the other NAND gate is coupled for receiving the remnant outputs of the NAND gate group ND74 so as to produce a B0_SET. The inverter group I75 includes 4 inverters each of which is coupled for receiving the corresponding output of the NAND gate group ND74, so as to produce a B1_CLEAR, a B1_SET, a B2_CLEAR and a B2_SET, respectively.

Referring back to FIG. 2, the data detect/modify block 210 is coupled to the above-described LRU SRAM block 204 through A_READ_DATA line, B_READ_DATA line, A_WRITE_DATA line and B_WRITE_DATA line each of which is composed of 3 bit. The data detect/modify block 210 precharges the READ_DATA lines in response to a READ PRECHARGE_TIME signal provided from the self time generating block 206 described above, and detects the READ_DATA so as to store the detected READ_DATA in synchronization with the READ LATCH_TIME signal, in which the detected A_READ_DATA is stored in two places and the detected B_READ_DATA is stored in one place. The block 210 also makes a detect data based on the A_port stored data so as to transfer it to the write way decoder block 212 and makes an LRU data so as to transfer it to an external control block which is not shown.

In addition, the data detect/modify block 210 receives the modify control signal from the way hit decoder block 208 and changes the other A_port latch data and B_port latch so as to provide the changed modify LRU data as write data, in which the modify control signal is needed for modifying the LRU modification and is composed of 6 bits per bit.

Figure 8:
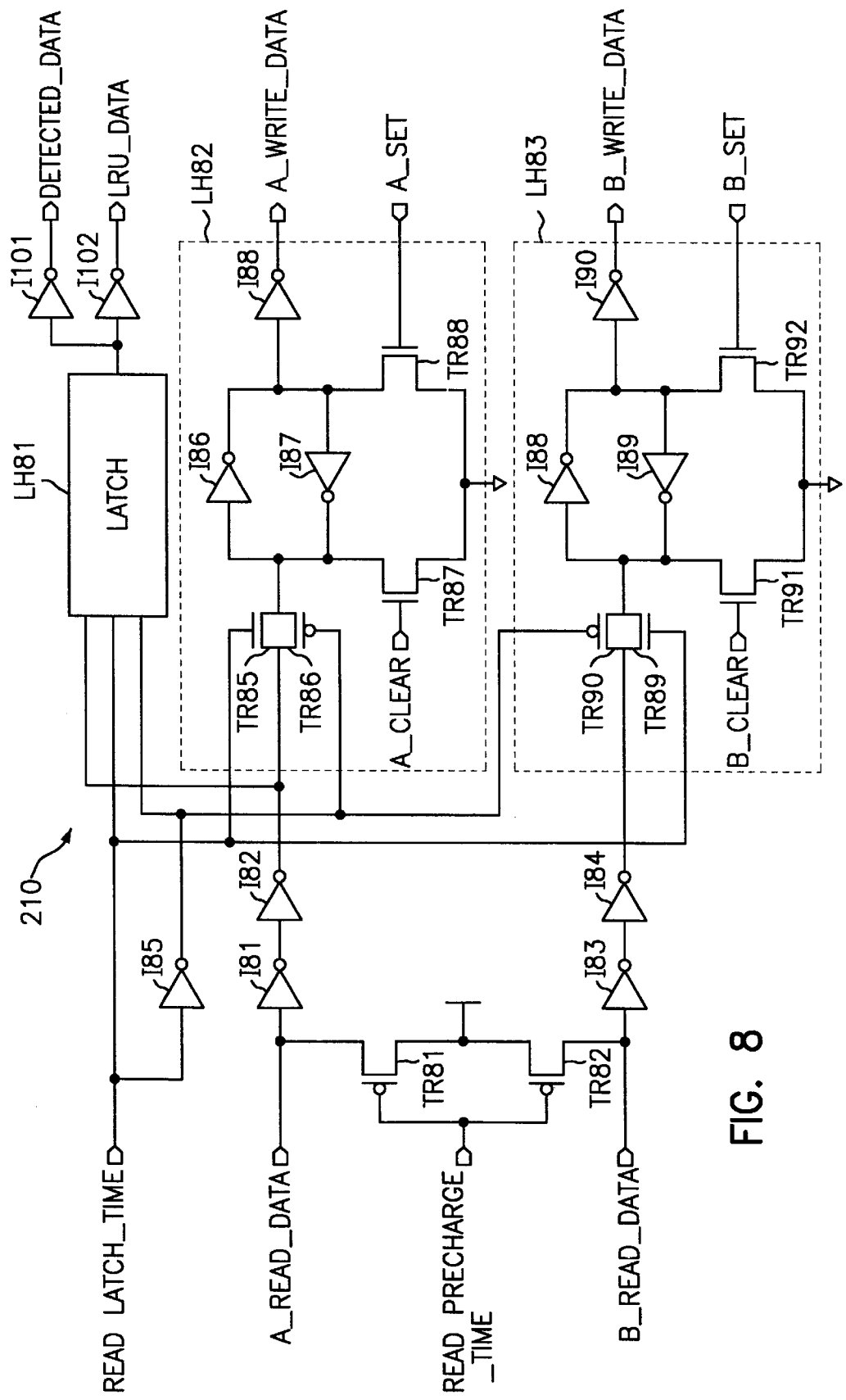
FIG. 8 is a detailed logic circuit diagram of the data detect/modify block shown in FIG. 2.

FIG. 8 shows one embodiment of the data detect/modify block 210 described above, which illustrates only a portion for one bit among 3 bits for A_port and 3 bits for B_port. In FIG. 8, the READ_DATA is applied from the LRU SRAM block 204 of FIG. 2 and the READ_DATA line is precharged to "high" level by the READ PRECHARGE_TIME which is a "low" active signal. If the READ_WORD signal is enabled, the corresponding data to the word is detected. At this time, the two inverters I81 and I82 may be replaced with amplifiers, if necessary.

Referring to FIG. 8, the data detect/modify block 210 includes two PMOS transistors TR81 and TR82 and a plurality of inverters I81, I82, I83, I84 and I85. The PMOS transistors TR81 and TR82 are applied with the READ PRECHARGE_TIME signal provided from the self time generating block 206, through respective gates. The inverters I81 and I82 are coupled in series for receiving the A_READ_DATA and the inverter I85 is coupled for receiving the READ LATCH_TIME signal. Here, the drain-source paths of the PMOS transistors TR81 and TR82 are coupled in series between the A_READ_DATA line and the B_READ_DATA line and the common source node thereof is coupled for receiving the power supply voltage.

Also, the data detect/modify block 210 further comprises three latches LH81, LH82 and LH83 which store data synchronizing with the READ LATCH_TIME when the READ_DATA is detected. The latch LH81 stores (or latches) data only in case of A_port, and makes a detect data and an LRU data based on the latched data. The latch LH82 stores data in case of A_port, and sets or makes the latched data clear so as to produce the WRITE_DATA, when the A_SET signal or the A_CLEAR signal are enabled. The latch LH83 stores only in case of B_port, and when the B_SET signal or the B_CLEAR signal are enabled, the latch LH83 makes the latched data set or clear so as to produce the WRITE_DATA.

Here, the two latches LH82 and LH83 have substantially the same configuration with each other. For example, the latch LH82 includes a plurality of MOS transistors TR85, TR86, TR87 and TR88, inverters I86, I87 and I88. The sources of the transistors TR85 and TR86 are commonly coupled to the output of the inverter I82 and the drains thereof are commonly coupled. The gate of the transistor TR85 is applied with the READ LATCH_TIME signal and the gate of the transistor TR86 is coupled for receiving the output of the inverter I85. The inverter I86 is coupled for receiving the common output of the transistors TR85 and TR86. The inverter I87 is coupled for receiving the output of the inverter I86 and its output is coupled to the common output of the transistors TR85 and TR86. The inverter I88 is coupled for receiving the output of the inverter I86 and its output is coupled to the A_WRITE_DATA line. The transistor TR87 receives the A_CLEAR signal through its gate and its source is coupled to the ground and its drain is coupled to the common drain of the transistors TR85 and TR86. The transistor TR88 receives the A_SET signal through its gate and its source is coupled to the ground and its drain is coupled to the output of the inverter I86 and to the input of the inverter I87.

Therefore, the data detect/modify block 210 stores the data to the respective latches LH81, LH82 and LH83 in accordance with the READ LATCH_TIME signal, when the READ_DATA is detected. In more detail, the latches LH81 and LH82 are used for storing the data in case of the A_port, while only the latch LH83 is used for storing the data in case of the B_port. When the SET signal or the CLEAR signal provided from the way hit decoder block are activated with the data being stored as such, the corresponding latch LH82 or LH83 is set or made to be clear so as to transfer the WRITE_DATA to the LRU SRAM block 204.

Referring back to FIG. 2, the write way decoder block 212 receives the detected 3-bit data from the data detect/modify block 210 and discriminates the least recently used way based on a pseudo LRU replacement policy. The write way decoder block 212 also latches the discriminated result in accordance with the WAY DECODER LATCH_TIME signal provided from the above-described self time generating block 206, so as to produce the WRITE_WAY signal. One example of such a write way decoder block 212 is shown in FIG. 9.

Figure 9:
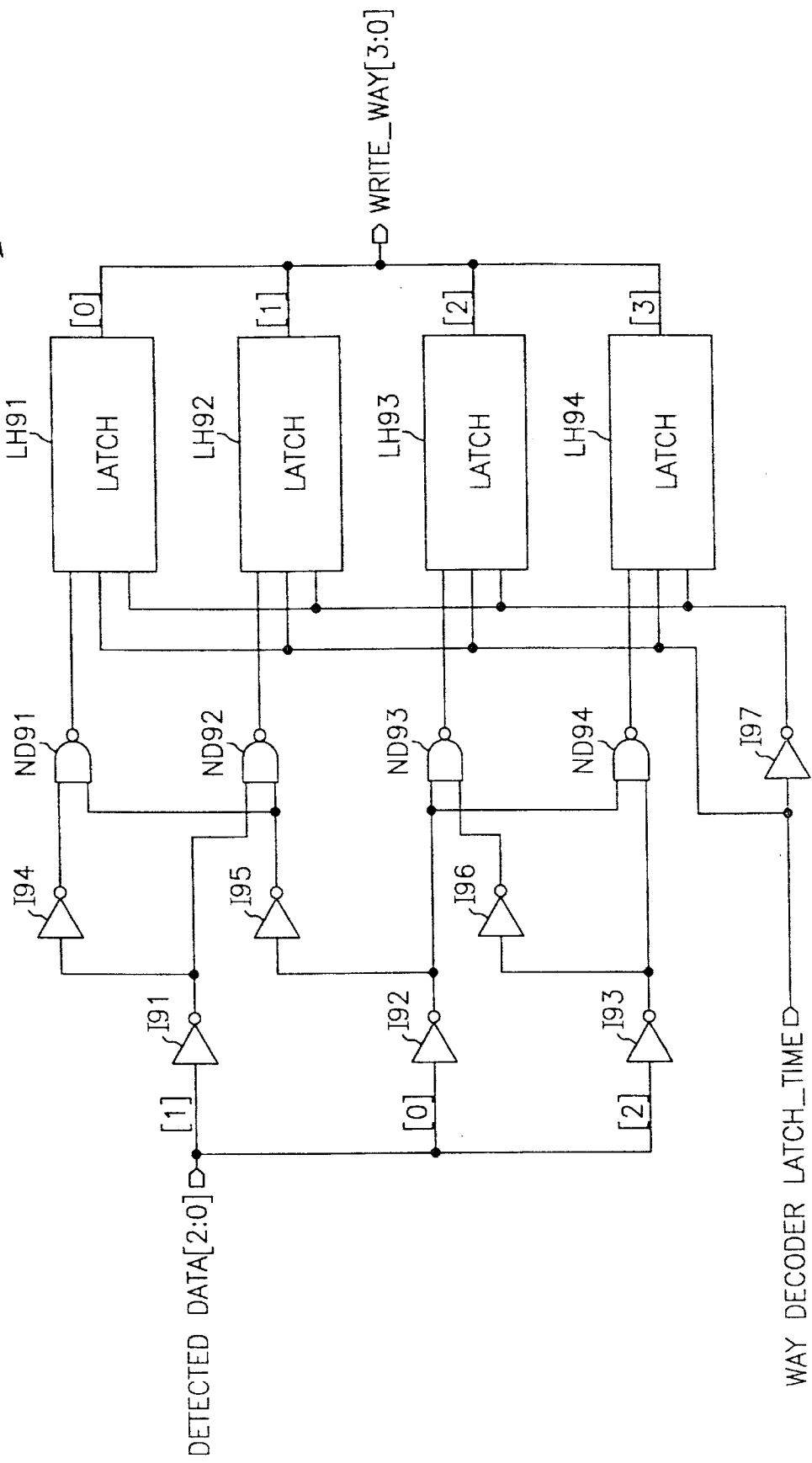
FIG. 9 is a detailed logic circuit diagram of the write way decoder block shown in FIG. 2.

Referring to FIG. 9, the write way decoder block 212 adopted in the present invention, includes a plurality of inverters I91, I92, I93, I94, I95, I96 and I97, four NAND gates ND91, ND92, ND93 and ND94 and four latches LH91, LH92, LH93 and LH94. The three inverters I91, I92 and I93 receives 3 bits of the detected data, respectively and the three inverters I94, I95 and I96 are coupled to the outputs of the inverters I91, I92 and I93, respectively. The NAND gate ND91 is coupled for receiving the output of the inverter I94 and the output of the inverter I95; the NAND gate ND92 is coupled for receiving the output of the inverter I91 and the output of the inverter I95; the NAND gate ND93 is coupled for receiving the output of the inverter I92 and the output of the inverter I96; the NAND gate ND94 is coupled for receiving the output of the inverter I92 and the output of the inverter I93. The four latches LH91, LH92, LH93 and LH94 receive the corresponding output of the NAND gates ND91, ND92, ND93 and ND94, respectively, and also receive the WAY DECODER LATCH_TIME signal as latch enable signal and the inverted WAY DECODER LATCH_TIME signal from the inverter I97 as latch disable signal.

Accordingly, the write way decoder block 212 decodes the discriminated 3-bit data, and if the detected data [1] is a logic "1" and the detected data [0] is a logic "1", since the way_0 is the least recently used way, the write way decoder block 212 generates a logic "0001" as the WRITE_WAY [3:0]. Alternatively, if the detected data[1] is a logic "0" and the detected data [0] is a logic "1", the write way decoder block 212 recognizes the way_1 as the least recently used way, so as to produce a logic "0010" of WRITE_WAY{3:0]. Similarly, if the detected data [2] is a logic "1" and the detected data [0] is a logic "0", the write way decoder block 212 produces a logic "0100" of WRITE_WAY[3:0], and if the detected data [2] is a logic "0" and the detected data [0] is a logic "0", the write way decoder block 212 produces a logic "1000" of WRITE_WAY[3:0].

This is because the self updating LRU memory according to the present invention uses LRU[0], LRU[1] and LRU[2] as a group bit, a low group bit and a high group bit, respectively, so as to store the pseudo LRU history. For the LRU[0] as the group bit, if the WAY_HIT is a low group (that is, if the way_0 or the way_1 are hit), the LRU[0] becomes a logic "0", and if the WAY_HIT is a high group (that is, if the way_2 or the way_3 are hit), the LRU[0] becomes a logic "1". For the low group bit of LRU[1], if the way_0 of the WAY_HIT is hit, the LRU[1] becomes a logic "0", and if the way_1 is hit, the LRU[1] becomes a logic "1". The LRU[2] as the high group bit becomes a logic "0", if the way_2 of the WAY_HIT is hit, and it becomes a logic "1" if the way_3 is hit.

In the meantime, in the present invention, the function of the LRU[2:0] of the pseudo LRU replacement policy may be changed for implementation as required. For example, the group bit, the low group bit and the high group bit may be exchanged with one other. For such an exchange, the write way decoder block and the way hit decoder block should be adapted to the exchanged LRU bit function so as to implement a high performance LRU memory for supporting a multi-port.

In addition, when the access entries are the same, the preferred embodiment of the present invention is implemented such that the modified LRU data is written into the A_port, but it may be implemented that the B write word is enabled by the address decoder and the way hit information of the A_port and the B_port is represented by the modify control signal of the B-port, so that the LRU data can be updated by the B_port.

Moreover, in the preferred embodiment of the present invention, the modify control signal is implemented, such that, when the access entries is the same, the B_port is first accessed and then the A_port is accessed, but it can be implemented such that the access order is changed and the way hit decoder block is simply modified according to the changed access order, so as to provide a high performance LRU memory for supporting a multi-port.

Meanwhile, in the preferred embodiment of the present invention, the LRU memory for supporting 8 entries is illustrated as one example, but the present invention is not limited to this, but can be applicable to the LRU memories for supporting 16 entries, 32 entries, 64 entries, and etc. For such cases, the address decoder block and the LRU SRAM block can be scaled so as to provide a high performance LRU memory for supporting a multi-port.

Figure 10:
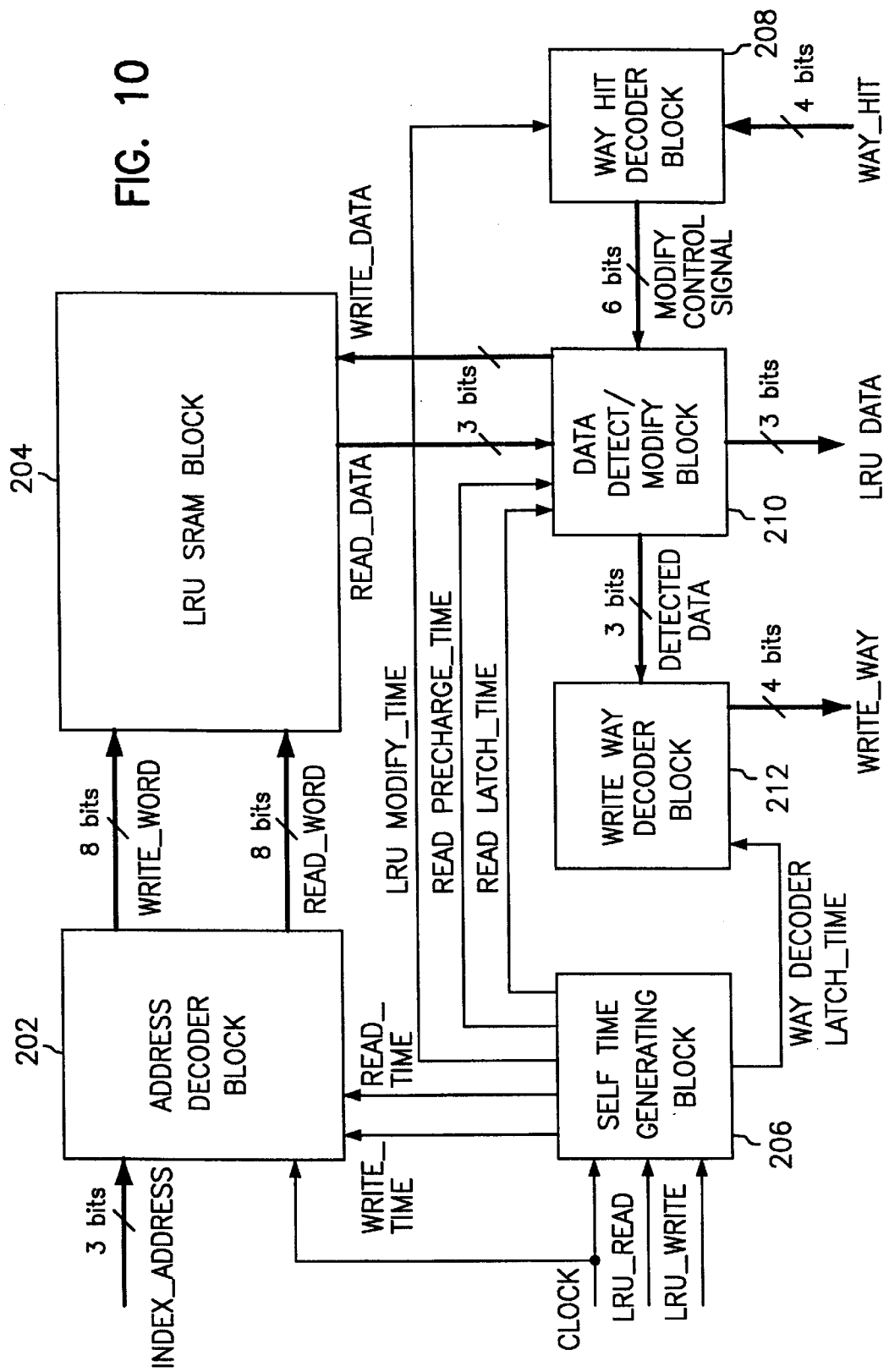
FIG. 10 is a block configuration of an LRU memory for supporting a single port according to the preferred embodiment of the present invention.

Also, in the preferred embodiment of the present invention, the LRU memory for supporting a multi-port (that is, A_port and B_port) is described as one example, the present invention is not limited to this, but is applicable to the LRU memory for supporting a single-port. In such a case, the LRU memory can includes the same structure as that shown in FIG. 10 and can be implemented by much simpler structure for the single port.

The LRU memory according to the preferred embodiment of the present invention, can be applicable to a cache memory using a Pseudo Least Recently Used replacement policy, and it includes the entry access history modify function in itself. Also, it has a write type of decoding function so that it can be suitable to be used for an LRU memory such as a cache memory of high performance superscalar microprocessor, a TLB (Translation Lookaside Buffer), BTB (Branch Target Buffer) and etc.

As described above, the present invention provides an LRU memory for supporting a multi-port, which is needed for operating various blocks, in a high performance microprocessor which adopts a superscalar technique and must use a cache memory, a TLB, a BTB or the like and is implemented by 4-way set associative. This LRU memory receives the way hit information from a cache tag block and analyzes the LRU history so as to provide in itself a write way based on a pseudo LRU replacement policy when the cache memory writes the 4-way. Also, for stably supporting these functions, the LRU memory includes the self time generating block, and reduces the load of control blocks for the cache memory, the TLB block or the BTB block, and makes an interface simple, thereby fast performing the LRU updating process so as to improve the performance of the superscalar microprocessor.

Although preferred embodiments of the present invention has been illustrated and described, various alternatives, modifications and equivalents may be used. Therefore, the foregoing description should not be taken as limiting the scope of the present invention which is defined by the appended claims.

What is claimed is:

1. An LRU memory capable of performing a pseudo replacement policy, comprising:

an address decoding means for decoding an INDEX_ADDRESS to produce a READ_WORD in response to a first phase of a CLOCK signal and to produce a WRITE_WORD in response to a second phase of the CLOCK signal;

an LRU storing means for storing a plurality of LRU data, producing an LRU data from a cell corresponding to the READ_WORD as a READ_DATA, and writing a WRITE_DATA to a cell corresponding to the WRITE_WORD;

a way hit decoding means for decoding a WAY_HIT so as to produce a MODIFY CONTROL signal in response to the second phase of the CLOCK signal;

a data modifying means for latching the READ_DATA from the LRU storing means to produce a DETECTED DATA and modifying the READ_DATA in response to the MODIFY CONTROL signal so as to producing the WRITE_DATA to the LRU storing means; and a write way decoding means for analyzing the DETECTED DATA in accordance with the pseudo replacement policy, so as for producing a WRITE_WAY.

2. An LRU memory according to claim 1, further comprising a control means for generating a plurality of control signals required for the LRU memory in response to the CLOCK signal, an LRU_READ signal used for enabling a read operation for the LRU memory, and an LRU_WRITE signal used for enabling a write operation for the LRU memory; and wherein said control means produces:

a READ PRECHARGE_TIME signal which becomes non-active in response to the first phase of the CLOCK signal and being used for precharging the READ_DATA;

a READ_TIME signal activated when the CLOCK signal is the first phase, the READ PRECHARGE_TIME signal is non-active and the LRU_READ signal is active, and being used for producing the READ_WORD in said address decoding means;

a READ LATCH TIME signal which becomes active after an activation of the READ_TIME signal and being used in said data modifying means;

an LRU MODIFY_TIME signal activated in responsive to the second phase of the CLOCK signal and being used for generating the MODIFY CONTROL signal in said way hit decoding means; and a WRITE_TIME signal activated when the CLOCK signal is the second phase, the LRU MODIFY_TIME signal is active and the LRU_WRITE signal is active, and being used for producing the WRITE_WORD in said address decoding means.

3. An LRU memory according to claim 2, wherein said control means further produces:

a WAY DECODER LATCH_TIME signal activated when the CLOCK signal is the second phase, the LRU MODIFY_TIME signal is active and the LRU_READ signal is active, and being used for producing the WRITE_WORD in said write way decoding means.

4. An LRU memory according to claim 3, wherein said control means comprises:

a) a first combination logic means for generating the READ PRECHARGE_TIME signal including:
a first inverter for receiving the CLOCK signal;
a first NAND gate having 2 inputs one of which is coupled for receiving an output of the first inverter; and
a second and a third inverters coupled in series for receiving an output of said first NAND gate and for producing the READ PRECHARGE_TIME signal;

b) a second combination logic means for generating the READ_TIME signal including:
a second NAND gate having 2 inputs one of which is coupled for receiving the clock signal;
a fourth and a fifth inverters coupled in series for receiving an output of said second NAND gate, wherein an output of said fifth inverter is applied to the other input of said first NAND gate; and
a first NOR gate coupled for receiving the output of the fifth inverter and the LRU_READ signal and for producing the READ_TIME signal;

c) a sixth and a seventh inverters coupled in series for receiving the READ_TIME signal so as to produce the READ LATCH_TIME signal;

d) a third combination logic means for producing the LRU MODIFY_TIME signal, including:
a eighth inverter for receiving the CLOCK signal;
a third NAND gate for receiving an output of the eighth inverter and the output of the fifth inverter; and
a ninth, a tenth and an eleventh inverters coupled in series for receiving an output of the third NAND gate, so as to produce the LRU MODIFY_TIME signal, wherein an output of said tenth inverter is applied to the other input of said second NAND gate;

e) a fourth combination logic means for producing the WAY DECODER LATCH_TIME signal, including:
a fourth NAND gate for receiving the output of the eighth inverter and the LRU MODIFY_TIME signal; and
a second NOR gate for receiving the LRU_READ signal and an output of said fourth NAND gate so as to produce the WAY DECODER LATCH_TIME signal; and f) a third NOR gate for receiving the output of the fourth NAND gate and the LRU_WRITE signal so as to produce the WRITE_TIME signal.

5. An LRU memory according to claim 1, further comprising a plurality of ports,
    wherein said INDEX_ADDRESS includes a plurality of port INDEX_ADDRESS signals each of which relates to one port, respectively; and
    wherein said address decoding means compares the port INDEX_ADDRESS signals with one another, and if all of the port INDEX_ADDRESS signals are the same, said address decoding means makes only one WRITE_WORD related to one port activated.

6. An LRU memory according to claim 1, further comprising a plurality of ports;
    wherein said INDEX_ADDRESS includes a plurality of port INDEX_ADDRESS signals each of which relates to one port; and
    wherein said address decoding means produces a COMPARE_HIT signal activated when the plurality of said port INDEX_ADDRESS signals are the same with each other, to provide the COMPARE_HIT signal to said way hit decoding means.

7. An LRU memory according to claim 6,
    wherein the number of ports is 2 and the INDEX_ADDRESS includes a first port INDEX_ADDRESS signal and a second port INDEX_ADDRESS signal each of which is composed of N-bits; and
    wherein said address decoding means comprises:
    a first latch means including N latches for latching the first port INDEX_ADDRESS signal;
    a second latch means including N latches for latching the second port INDEX_ADDRESS signal;
    a comparing means for comparing an output of said first latch means with an output of said second latch means, so as to produce the COMPARE_HIT signal;
    a first READ_WORD generating means for decoding the output of said first latch means when the READ_TIME signal is active, so as to produce a first port READ_WORD;
    a first WRITE_WORD generating means for decoding the output of said first latch means when the WRITE_TIME signal is active, so as to produce a first port WRITE_WORD;
    a second READ_WORD generating means for decoding the output of said second latch means when the READ_TIME signal is active, so as to produce a second port READ_WORD; and
    a second WRITE_WORD generating means for decoding the output of said second latch means when the WRITE_TIME signal is active, so as to produce a second port WRITE_WORD.

8. An LRU memory according to claim 7, wherein said N is 3 and said first latch means and said second latch means comprise 3 latches, respectively.

9. An LRU memory according to claim 8, wherein said first READ_WORD generating means comprises:
    three inverters each of which is coupled for receiving one bit of the output of said first latch means;
    eight NAND gates each of which selectively receives the output of said first latch means and outputs of said three inverters; and
    eight NOR gates each of which is coupled for receiving the READ_TIME signal and an output of said corresponding NAND gate, so as to produce a corresponding bit of the first port READ_WORD.

10. An LRU memory according to claim 8, wherein said first WRITE_WORD generating means comprises:
    three inverters each of which is coupled for receiving one bit of the output of said first latch means;
    eight NAND gates each of which selectively receives the output of said first latch means and outputs of said three inverters; and
    eight NOR gates each of which is coupled for receiving the WRITE_TIME signal and an output of said corresponding NAND gate, so as to produce a corresponding bit of the first port WRITE_WORD.

11. An LRU memory according to claim 8, wherein said second READ_WORD generating means comprises:
    three inverters each of which is coupled for receiving one bit of the output of said second latch means;
    eight NAND gates each of which selectively receives the output of said second latch and outputs of said three inverters; and
    eight NOR gates each of which is coupled for receiving the READ_TIME signal and an output of said corresponding NAND gate, so as to produce a corresponding bit of the second port READ_WORD.

12. An LRU memory according to claim 8, wherein said second WRITE_WORD generating means comprises:
    three inverters each of which is coupled for receiving one bit of the output of said second latch means;
    eight NAND gates each of which selectively receives the output of said second latch means and outputs of said three inverters; and
    eight NOR gates each of which is coupled for receiving the WRITE_TIME signal and an output of said corresponding NAND gate, so as to produce a corresponding bit of the second port WRITE_WORD.

13. An LRU memory according to claim 2,
    wherein the number of ports is 2; the WRITE_WORD includes a first port WRITE_WORD and a second port WRITE_WORD; the WRITE_DATA includes a first port WRITE_DATA and a second port WRITE_DATA; the READ_WORD includes a first port READ_WORD and a second port READ_WORD; the READ_DATA includes a first port READ_DATA and a second port READ_DATA;
    wherein said LRU storing means comprises a number of unit memory cells each of which includes:
    a first transistor being turned on in response to the first port WRITE_WORD so as to transfer the first port WRITE_DATA;
    a first inverter for receiving an output of said first transistor;
    a second transistor being turned on in response to the second port WRITE_WORD so as to transfer the second port WRITE_DATA;
    a second inverter for receiving an output of said second transistor;
    a third transistor being turned on in response to an output of the first inverter and its source being coupled to a ground;
    a fourth transistor whose drain is coupled to a drain of said third transistor and whose gate is coupled for receiving the first port READ_WORD signal, so as to produce the first port READ_DATA through its source;
    a fifth transistor being turned on in response to an output of the second inverter and its source being coupled to a ground; and
    a sixth transistor whose drain is coupled to a drain of said fifth transistor and whose gate is coupled for receiving the second port READ_WORD signal, so as to produce the second port READ_DATA through its source.

14. An LRU memory according to claim 7, wherein said way hit decoding means comprises:
 a first combination logic means including a plurality of inverters each of which is coupled for receiving a corresponding bit of a first port WAY_HIT signal;
 a second combination logic means including a plurality of NAND gates each of which is coupled for receiving a corresponding output of said first combination logic means and an inverted COMPARE_HIT signal;
 a third combination logic means including a plurality of NAND gates each of which is coupled for receiving one bit of a second port WAY_HIT signal and one output of said first combination logic means;
 a fourth combination logic means including a plurality of NAND gates each of which is coupled for receiving a corresponding output of said third combination logic means and a corresponding output of said first combination logic means;
 a fifth combination logic means including a plurality of OR gates each of which is coupled for receiving one bit of an output of said fourth combination logic means and the inverted COMPARE_HIT signal;
 a sixth combination logic means including a plurality of 3-input NAND gates each of which is coupled for receiving one bit of an output of said second combination logic means, one bit of an output of said fifth combination logic means, and the LRU MODIFY_TIME signal;
 a seventh combination logic means including a plurality of 2-input NAND gates each of which receives any two bits of an output of said sixth combination logic means;
 an eighth combination logic means including a plurality of inverters each of which is coupled for receiving one bit of the output of said sixth combination logic means, said seventh and said eighth combination logic means producing a first port CLEAR signal and a first port SET signal;
 a ninth combination logic means including a plurality of 2-input NAND gates each of which is coupled for receiving one bit of the second port WAY_HIT signal and the LRU MODIFY_TIME signal;
 a tenth combination logic means including a plurality of 2-input NAND gates each of which receives any two bits of an output of said ninth combination logic means; and
 a eleventh combination logic means including a plurality of inverters each of which is coupled for receiving one bit of the output of said ninth combination logic means, said tenth and said eleventh combination logic means producing a second port CLEAR signal and a second port SET signal.

15. An LRU memory according to claim 2, wherein said data modifying means comprises:
 a first transistor whose gate is applied with the READ PRECHARGE_TIME signal, whose drain is applied with a power supply voltage and whose source is applied with a first port READ_DATA signal;
 a second transistor whose gate is applied with the READ PRECHARGE_TIME signal, whose drain is applied with the power supply voltage and whose source is applied with a second port READ_DATA;
 a first and a second inverters coupled in series for receiving the first port READ_DATA signal;
 a third and a fourth inverters coupled in series for receiving the second port READ_DATA signal;
 a first latch means for latching an output of said second inverter in synchronization with the READ LATCH_TIME signal so as to produce the DETECTED DATA;
 a second latch means for storing the first port READ_DATA signal in response to the READ LATCH_TIME signal, for setting a stored signal therein in response to a first port SET signal, and for clearing the stored signal in response to a first port CLEAR signal; and
 a third latch means for storing the second port READ_DATA signal in response to the READ LATCH_TIME signal, for setting a stored signal therein in response to a second port SET signal, and for clearing the stored signal in response to a second port CLEAR signal, said first port SET signal, said second port SET signal, said first port CLEAR signal and said second port CLEAR signal being included in the MODIFY CONTROL signal.

16. An LRU memory according to claim 15, wherein each of said second latch means and said third latch means, comprises:
 a first transfer gate for transferring the corresponding output of said second inverter or said fourth inverter in response to the READ LATCH_TIME signal;
 a fifth inverter coupled for receiving an output of said first transfer gate;
 a sixth inverter coupled for receiving an output of said fifth inverter and whose output is coupled to the output of said first transfer gate;
 a seventh inverter coupled for receiving the output of said fifth inverter for producing the corresponding port WRITE_DATA signal;
 a third transistor being gated by the corresponding port CLEAR signal and whose drain-source path is coupled between the output of said first transfer gate and the ground; and
 a fourth transistor being gated by the corresponding port SET signal and whose drain-source path is coupled between the output of said fifth inverter and the ground.

17. An LRU memory according to claim 2, wherein said write way decoding means comprises:
 a first, a second and a third inverters each of which is coupled for receiving a corresponding bit of the DETECTED DATA;
 a fourth, a fifth and a sixth inverters each of which is coupled for receiving a corresponding output of said first, said second and said third inverters, respectively;
 a first 2-input NAND gate coupled for receiving outputs of said fourth inverter and said fifth inverter;
 a second 2-input NAND gate coupled for receiving outputs of said first inverter and said fifth inverter;
 a third 2-input NAND gate coupled for receiving outputs of said second inverter and said sixth inverter;
 a fourth 2-input NAND gate coupled for receiving outputs of said second inverter and said third inverter; and
 four latches for latching a corresponding output of said first, said second, said third and said fourth NAND gates, in response to the WAY DECODER LATCH_TIME signal, so as to produce the WRITE_WAY.

18. An LRU memory according to claim 17, wherein said write way decoding means determines the least recently used way as the WRITE_WAY.

19. An LRU memory according to claim 1, wherein said write way decoding means determines the least recently used way as the WRITE_WAY.

20. An LRU memory according to claim 1, wherein said LRU memory supports a single port.

* * * * *